United States Patent [19]  
Fukushima et al.

[11] Patent Number: 4,671,626  
[45] Date of Patent: Jun. 9, 1987

[54] PHOTOGRAPHIC LENS SYSTEM

[75] Inventors: Akira Fukushima; Yoshinobu Kudo, both of Osaka, Japan

[73] Assignee: Minolta Camera Kabushiki Kaisha, Osaka, Japan

[21] Appl. No.: 715,151

[22] Filed: Mar. 21, 1985

[30] Foreign Application Priority Data

Mar. 21, 1984 [JP] Japan .................................. 59-54636  
Mar. 26, 1984 [JP] Japan .................................. 59-59280

[51] Int. Cl.⁴ .......................... G02B 9/60; G02B 13/18  
[52] U.S. Cl. ..................................... 350/466; 350/432  
[58] Field of Search ................................. 350/466, 432

[56] References Cited

U.S. PATENT DOCUMENTS 2,748,656  6/1956  Berger et al.  
2,777,363  1/1957  Wanke et al.  
3,376,090  4/1968  Hudson  
3,912,379  10/1975 De Jager ............................ 350/432  
4,376,571  3/1983  Ikemori

FOREIGN PATENT DOCUMENTS 1100312  8/1961  Fed. Rep. of Germany  
30-9465  12/1955 Japan  
31-6986   8/1956  Japan  
37-13038  9/1962  Japan  
45-35742  11/1970 Japan  
54-104335 8/1979  Japan  
0111914   8/1980  Japan ................................ 350/467  
56-70516  6/1981  Japan  
56-102819 8/1981  Japan  
1503456   3/1978  United Kingdom ................ 350/466

Primary Examiner—John K. Corbin  
Assistant Examiner—Rebecca D. Gass  
Attorney, Agent, or Firm—Price, Gess & Ubell

[57] ABSTRACT

A photographic lens system of 5-elements comprises from the object side to the image side, a first lens element of a positive lens element having an object side surface convex to the object side, a second lens element of a negative meniscus lens element concave to the image side, a third lens element of a negative lens element having an object side surface concave to the object side, a fourth lens element of a positive meniscus lens element convex to the image side, and a fifth lens element of a positive lens element, wherein an air lens formed between the third lens element and the fourth lens element has a negative refractive power. The air lens is effective for correcting each aberrations.

11 Claims, 66 Drawing Figures

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

SPHERICAL ABERRATION
SINE CONDITION

ASTIGMATISM

DISTORTION (%)

PHOTOGRAPHIC LENS SYSTEM

BACKGROUND OF THE INVENTION

1. Field of the Invention

The present invention relates to a photographic lens system, and more particularly to a 5-group, 5-element photographic lens system having an angle of view greater than 20° and an aperture ratio of about F/2.0.

2. Description of the Prior Art

A Gauss type lens system and modifications thereof are used in various single lens reflex type camera system as a standard lens or a telephoto lens. Various types of such lens systems consist of six or seven lens elements.

Then, in order to decrease the number of the lens elements, 4-groups, 5-elements or 5-groups, 5-elements constructions have been suggested. For example, in Japanese Patent Publication No. 30-9465 discloses 4-groups, 5-elements lens system in which the rear lens group located on the image side consists of two elements having a negative meniscus lens element concave to the object side and a positive lens element. However, although such lens system is effective for making the construction of the lens system more simple, it is difficult to obtain a large aperture ratio reaching about F/2.0.

On the other hand, in Japanese Patent Publication No. 31-6986, 5-groups, 5-elements lens system is disclosed in which the front lens group located on the object side consists of two lens elements including a positive lens element and a negative meniscus lens element concave to the image side. Such a lens system is capable of obtaining a large aperture ratio, compared with the above 4-groups, 5-elements lens system. But it has a defect in that the coma can not be corrected well in the middle area of the image. Thus, the capability of the representation is not sufficient.

Furthermore, the other lens system of 5-groups, 5-elements type have been also suggested in which the lens system consists, from the object side, of a positive first lens element convex to the object side, a positive meniscus second lens element convex to the object side, a negative meniscus third lens element concave to the image side, a negative meniscus fourth lens element concave to the object side, and a positive fifth lens element. Such a lens system is known as a Xenotar type, and has a characteristic that the object side surface of the fourth lens element is almost concentric with the image side surface thereof. Therefore, polishing of such surfaces and centering and edging are difficult in manufacturing the fourth lens element. Then, if the fourth lens element is made of a synthetic resin material, it would be free from such difficulty. However, in the conventional design, the fourth lens element is made of high-index glass material. Thus, it has been difficult to obtain the sufficient optical performance with applying the synthetic resin material to the fourth lens element instead of the glass material.

SUMMARY OF THE INVENTION

The object of the present invention is to provide a photographic lens system of 5-elements in which the capability of the image representation is improved in comparison with that of the conventional 5-elements type lens system.

Another object of the present invention is to provide a Xenotar type photographic lens system having a high optical performance even though the fourth lens element is made of the synthetic resin material.

According to the present invention, the photographic lens system of 5-elements comprises from the object side to the image side, a first lens element of a positive lens element having an object side surface convex to the object side; a second lens element of a negative meniscus lens element concave to the image side; a third lens element of a negative lens element having an object side surface concave to the object side; a fourth lens element of a positive meniscus lens element convex to the image side; and a fifth lens element of a positive lens element, wherein an air lens formed between the third lens element and the fourth lens element has a negative refractive power, and wherein the lens system fulfills the following conditions:

$$0.10 < |\phi_A/\phi| < 3.00$$

$$0.9 < r_3/(r_4 + d_3) < 2.0$$

wherein, $\phi_A$ represents the refractive power of the air lens formed between the third lens element and the fourth lens element; $\phi$ represents the compound refractive power of the whole lens system; $r_3$ represents the radius of curvature of the object side surface of the second lens element; $r_4$ represents the radius of curvature of the image side surface of the second lens element; and $d_3$ represents the axial thickness of the second lens element.

Furthermore, according to the present invention, the Xenotar type photographic lens system comprises from the object side to the image side; a first lens element of a positive lens element having an object side surface convex to the object side; a second lens element of a positive meniscus lens element convex to the object side; a third lens element of a negative meniscus lens element concave to the image side; a fourth lens element concave to the image side or a fourth lens element of a negative meniscus lens element concave to the object side; and a fifth lens element of a positive lens element, where the lens system fulfills the following conditions;

$$1.45 < N_4 < 1.65$$

$$0.23 < r_4/r_5 < 0.58$$

$$0.28 < |\phi_4/\phi| < 0.55$$

wherein: $N_4$ represents the refractive index of the fourth lens element; $r_4$ represents the radius of curvature of the image side surface of the second lens element; $r_5$ represents the radius of curvature of the object side surface of the third lens element; $\phi_4$ represents the refractive power of the fourth lens element; and $\phi$ represents the refractive power of the whole lens system.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

Figure 1:
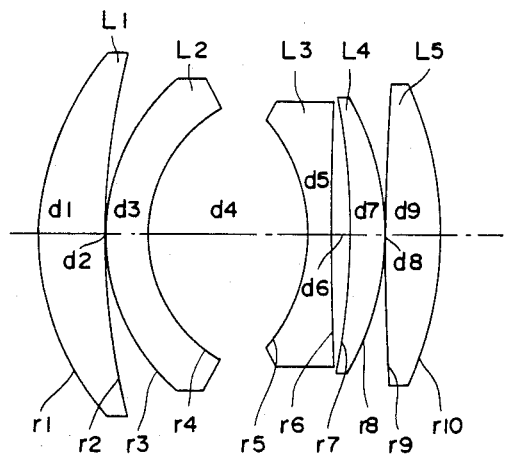
FIG. 1 represents a cross sectional view of the lens system according to first to fifth embodiments of the present invention.

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured compact lens system. The derivation of the forumulas and the relation of the powers set forth hereinin can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of lens elements. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 2:
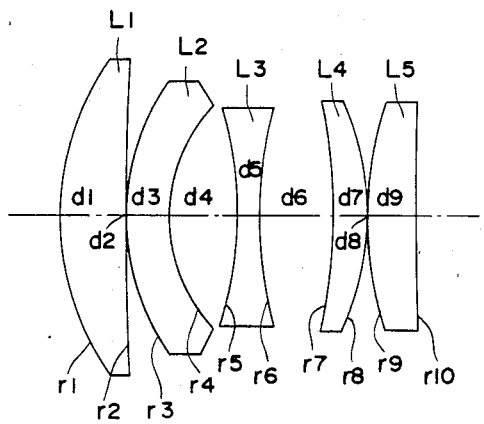
FIG. 2 represents a cross sectional view of the lens system according to sixth or seventh embodiment of the present invention.

As shown in FIGS. 1 and 2, the present invention provides a photographic lens system of 5-elements comprising from the object side to the image side, a first lens element ($L_1$) of a positive lens element having an object side surface convex to the object side; a second lens element ($L_2$) of a negative meniscus lens element concave to the image side; a third lens element ($L_3$) of a negative lens element having an object side surface concave to the object side; a fourth lens element ($L_4$) of a positive meniscus lens element convex to the image side; and a fifth lens element ($L_5$) of a positive lens element, wherein an air lens formed between the third lens element ($L_3$) and the fourth lens element ($L_4$) has a negative refractive power, and wherein the lens system fulfills the following conditions:

$$0.10 < |\phi_A/\phi| < 3.00 \qquad (1)$$

$$0.9 < r_3/(r_4+d_3) < 2.0 \qquad (2)$$

wherein, $\phi_A$ represents the refractive power of the air lens formed between the third lens element ($L_3$) and the fourth lens element ($L_4$); $\phi$ represents the compound refractive power of the whole lens system; $r_3$ represents the radius of curvature of the object side surface of the second lens element ($L_2$); $r_4$ represents the radius of curvature of the image side surface of the second lens element ($L_2$); and $d_3$ represents the axial thickness of the second lens element.

Condition (1) defines the refractive power of the air lens formed between the third lens element ($L_3$) and the fourth lens element ($L_4$). The air lens is effective for correcting the coma in the middle area of the image plane. If the lower limit of the condition (1) is violated, since the correcting effect of the air lens is decreased, the coma is greatly increased in the middle area of the image plane. If the upper limit of the condition (1) is violated, although the coma is corrected well, the aspheric difference is greatly increased in the middle and marginal area of the image plane.

The upper limit of condition (2) is effective for making the whole lens system compact. If the upper limit of the condition (2) is violated, the light rays, which passes in parallel with the optical axis, are extended in width after passing through the second lens element ($L_2$). Thus, it causes to increase the diameters of the third to fifth elements and to extend the back focal distance of the whole lens system unnecessarily. Contrary, the lower limit of the condition (2) is effective for correcting the field curvature. If the lower limit of the condition (2) is violated, since Petzval sum becomes the large positive value, the image plane in the sagittal direction is greatly curved in the negative direction.

Furthermore, the following conditions are effective for further improving the optical performance of the whole lens system:

$$0.10 < d_4/\phi < 0.35 \tag{3}$$

$$1.00 < |\phi_1/\phi_2| < 4.50 \tag{4}$$

wherein, $d_4$ represents the axial distance between the image side surface of the second lens element and the object side surface of the third lens element; $\phi_1$ represents the refractive power of the first lens element; and $\phi_2$ represents the refractive power of the second lens element.

Condition (3) is effective for correcting the astigmatism further well, and for secure the sufficient light amount in the marginal area of the image. If the lower limit of the condition (3) is violated, the astigmatic difference is undesirably increased in the middle area of the image. If the upper limit of the condition (3) is violated, since the number of the light rays reaching to the marginal area of the image are undesirably decreased, the sufficient light amount can not be obtained in the marginal area of the image. Additionally, the total length of the whole lens system is extended unfavorably.

Condition (4) is effective for correcting the distortion and for securing the back focal distance required for use in a single lens reflex camera system. If the lower limit of the condition (4) is violated, the negative distortion is greatly generated. If the upper limit of the condition (4) is violated, the positive distortion is greatly generated and it becomes difficult to secure the back focal distance sufficient to the single lens reflex camera system.

Furthermore, in order to correct the spherical aberration and the coma in the middle area of the image, it is effective to introduce an aspheric surface to at least one surface of the second lens element ($L_2$).

Figure 3:
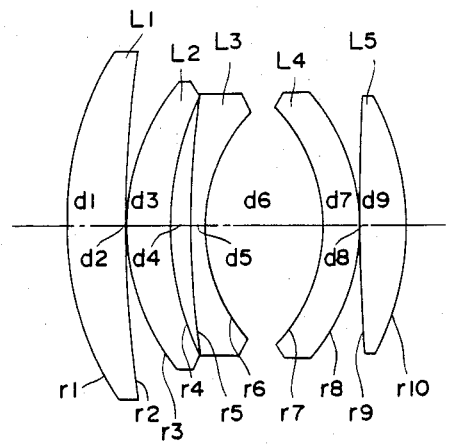
FIG. 3 represents a cross sectional view of the lens system according to eighth to twenty-first embodiments of the present invention.
Figure 4A:
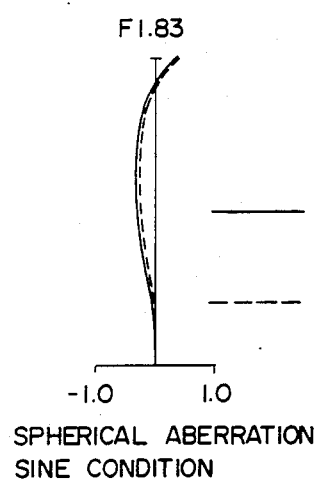
FIGS. 4a to 4c represent the aberration curves of the first embodiment.
Figure 4B:
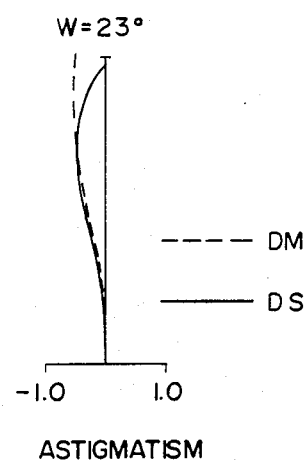
Figure 4C:
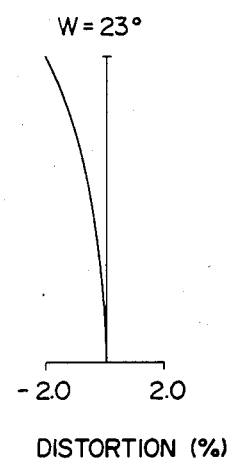
Figure 5A:
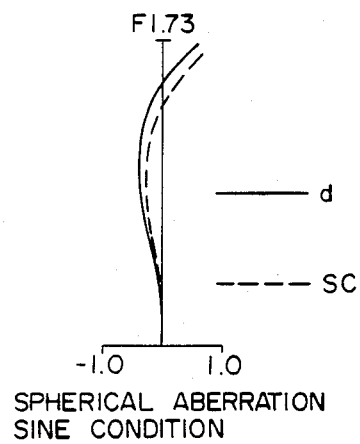
FIGS. 5a to 5c represent the aberration curves of the second embodiment.
Figure 5B:
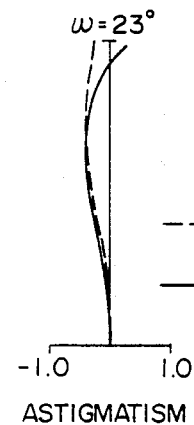
Figure 5C:
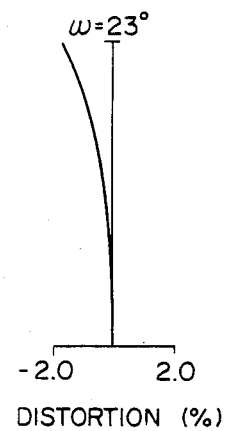
Figure 6A:
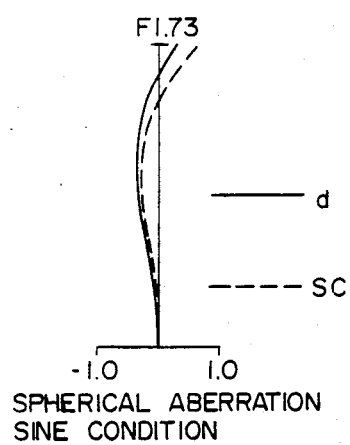
FIGS. 6a to 6c represent the aberration curves of the third embodiment.
Figure 6B:
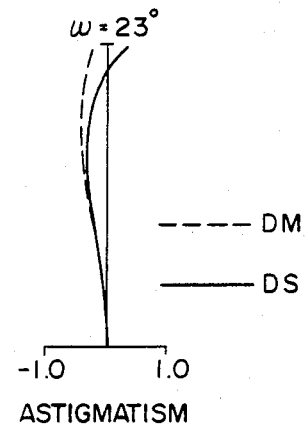
Figure 6C:
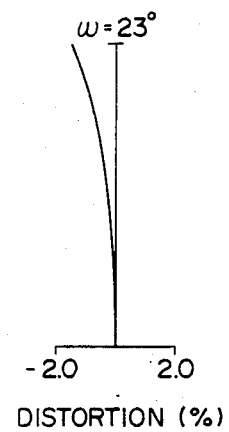
Figure 7A:
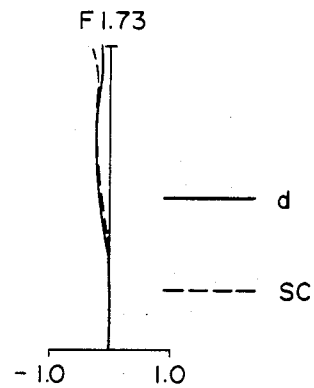
FIGS. 7a to 7c represent the aberration curves of the fourth embodiment.
Figure 7B:
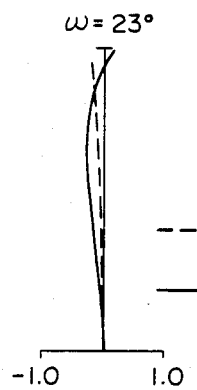
Figure 7C:
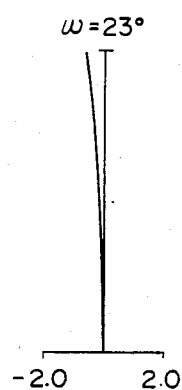
Figure 8A:
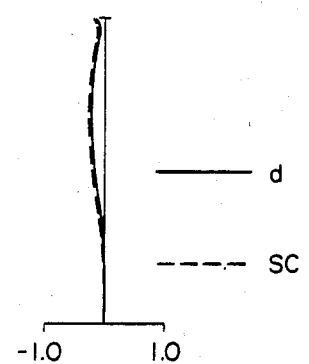
FIGS. 8a to 8c represent the aberration curves of the fifth embodiment.
Figure 8B:
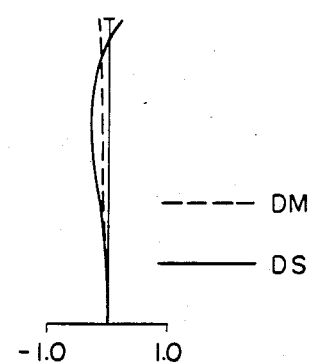
Figure 8C:
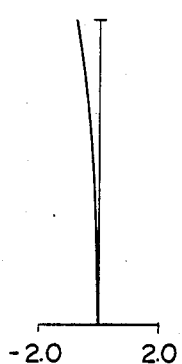
Figure 9A:
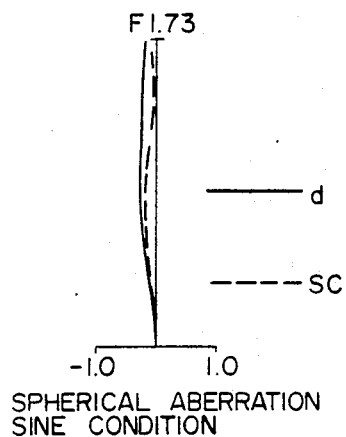
FIGS. 9a to 9c represent the aberration curves of the sixth embodiment.
Figure 9B:
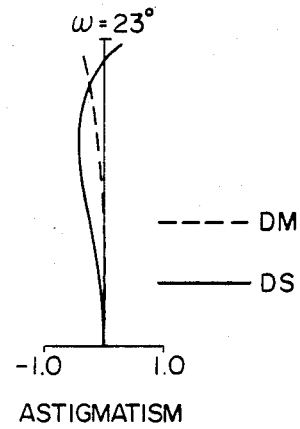
Figure 9C:
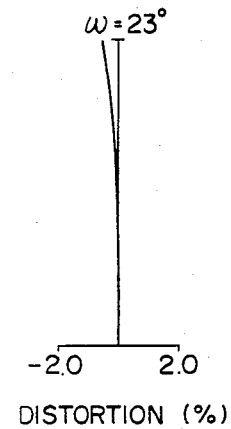
Figure 10A:
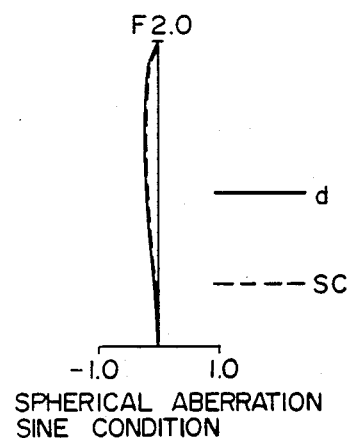
FIGS. 10a to 10c represent the aberration curves of the seventh embodiment.
Figure 10B:
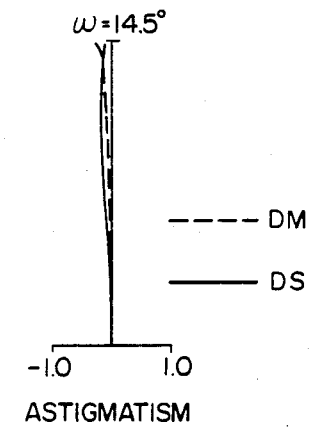
Figure 10C:
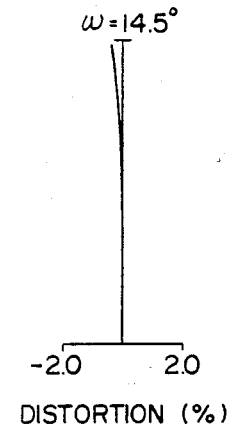
Figure 11A:
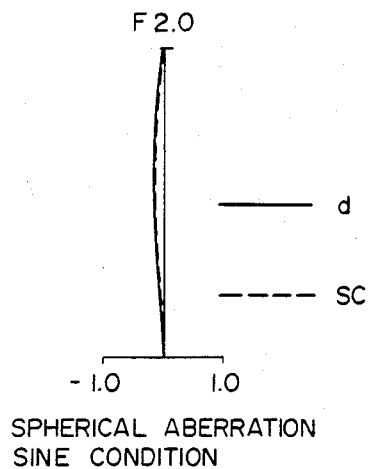
FIGS. 11a to 11c represent the aberration curves of the eighth embodiment.
Figure 11B:
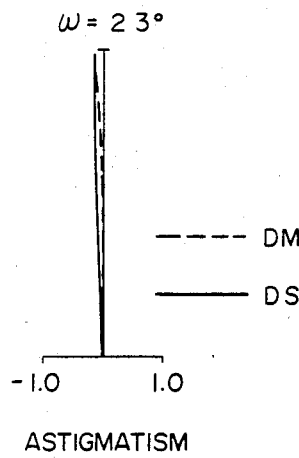
Figure 11C:
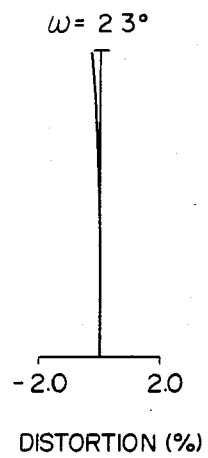
Figure 12A:
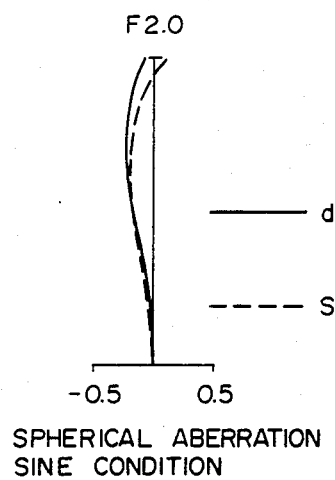
FIGS. 12a to 12c represent the aberration curves of the ninth embodiment.
Figure 12B:
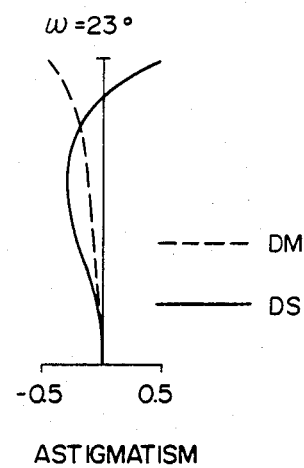
Figure 12C:
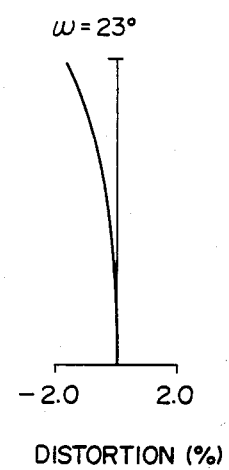
Figure 13A:
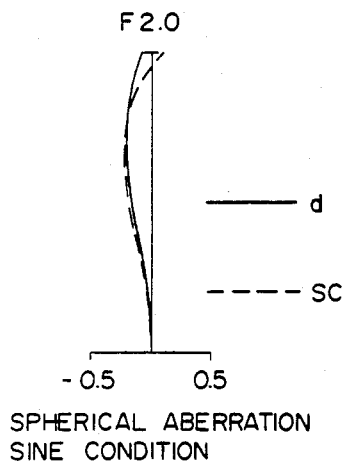
FIGS. 13a to 13c rrepresent the aberration curves of the tenth embodiment.
Figure 13B:
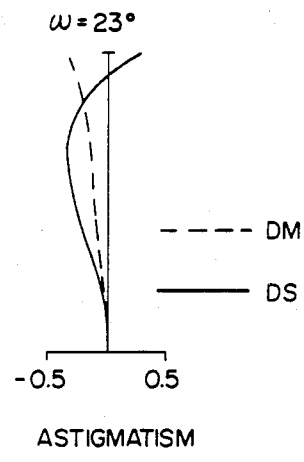
Figure 13C:
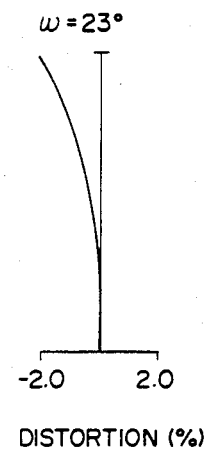
Figure 14A:
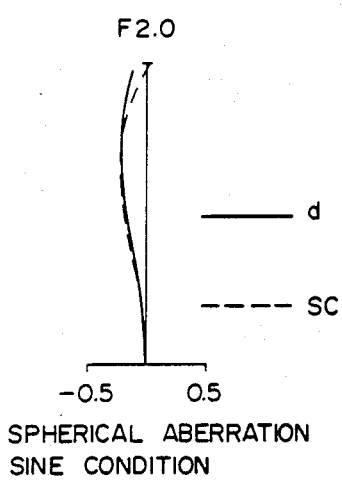
FIGS. 14a to 14c represent the aberration curves of the eleventh embodiment.
Figure 14B:
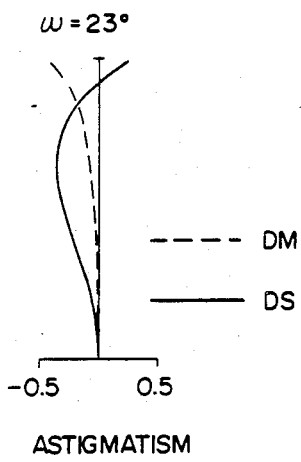
Figure 14C:
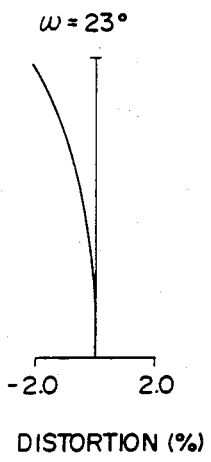
Figure 15A:
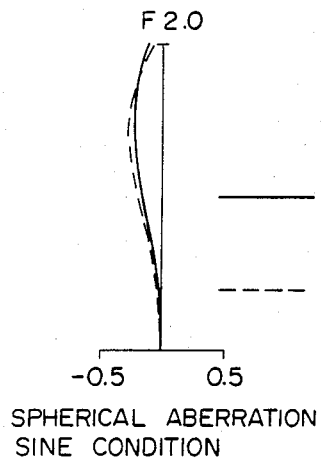
FIGS. 15a to 15c represent the aberration curves of the twelfth embodiment.
Figure 15B:
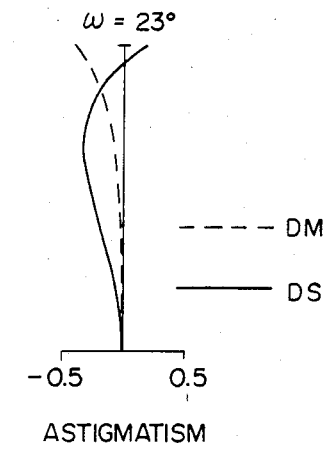
Figure 15C:
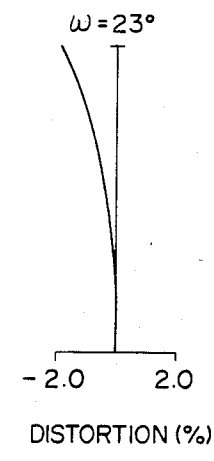
Figure 16A:
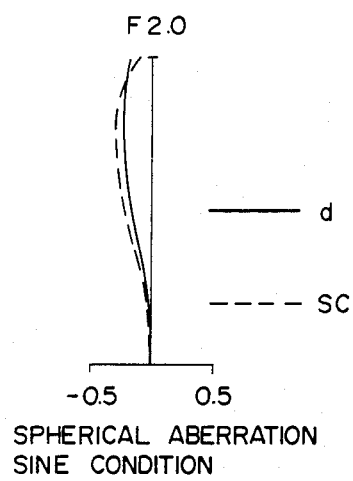
FIGS. 16a to 16c represent the aberration curves of the thirteenth embodiment.
Figure 16B:
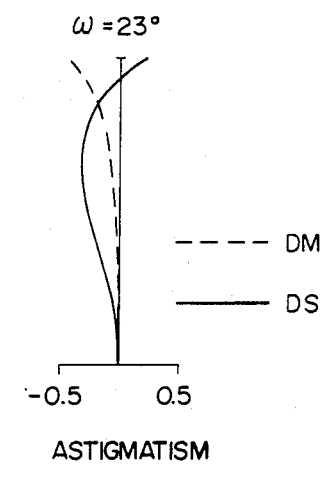
Figure 16C:
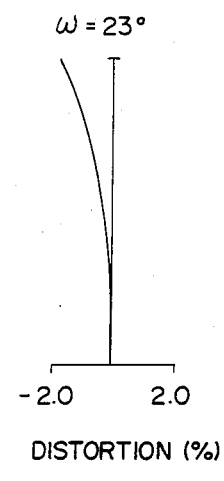
Figure 17A:
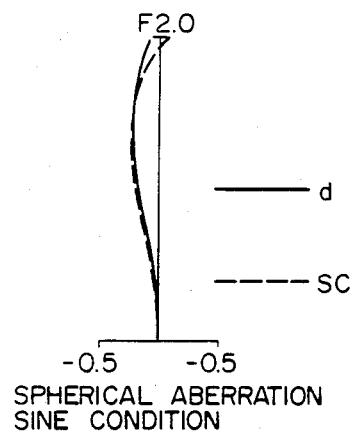
FIGS. 17a to 17c represent the aberration curves of the fourteenth embodiment.
Figure 17B:
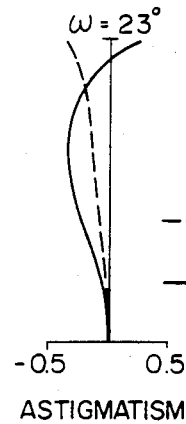
Figure 17C:
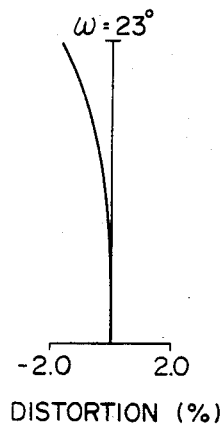
Figure 18A:
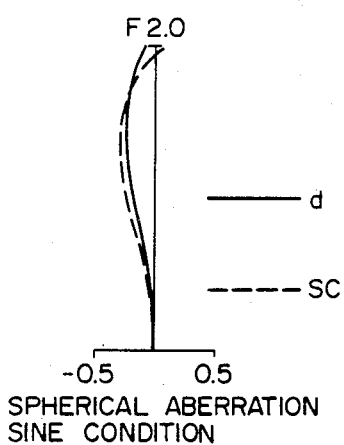
FIGS. 18a to 18c represent the aberration curves of the fifteenth embodiment.
Figure 18B:
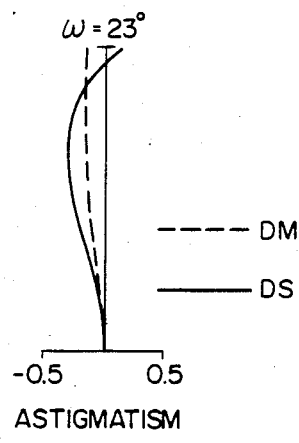
Figure 18C:
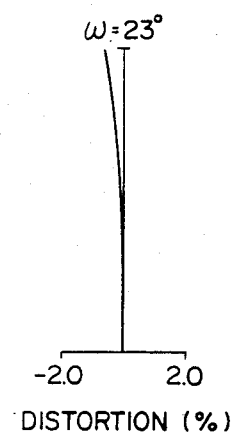
Figure 19A:
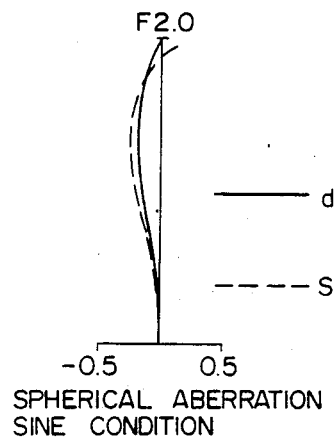
FIGS. 19a to 19c represent the aberration curves of the sixteenth embodiment.
Figure 19B:
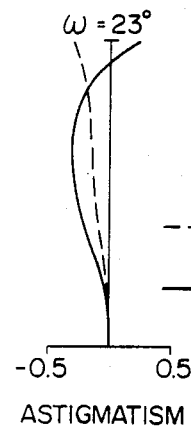
Figure 19C:
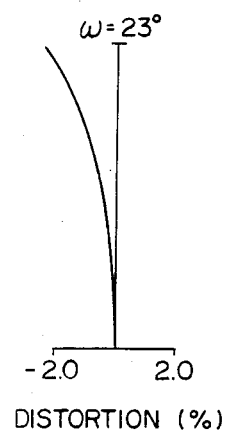
Figure 20A:
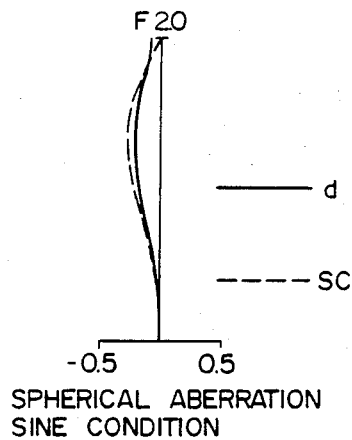
FIGS. 20a to 20c represent the aberration curves of the seventeeth embodiment.
Figure 20B:
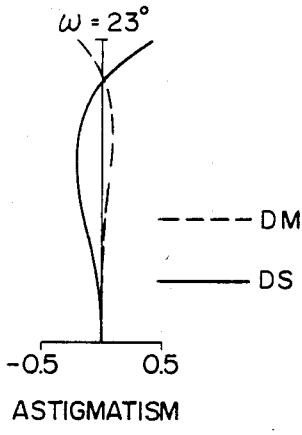
Figure 20C:
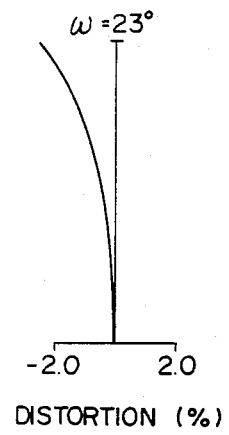
Figure 21A:
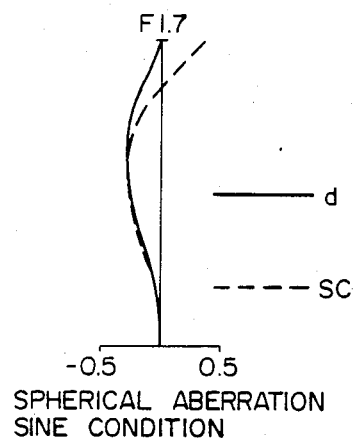
FIGS. 21a to 21c represent the aberration curves of the eighteenth embodiment.
Figure 21B:
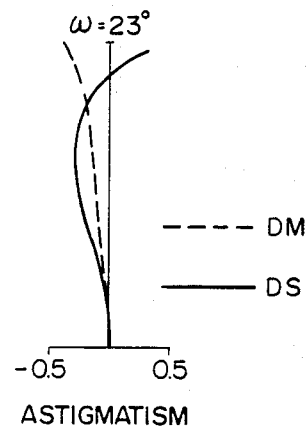
Figure 21C:
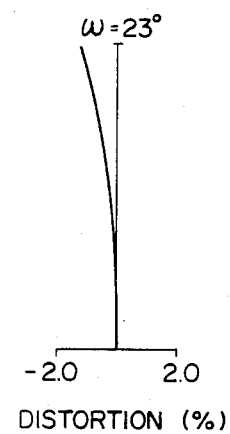
Figure 22A:
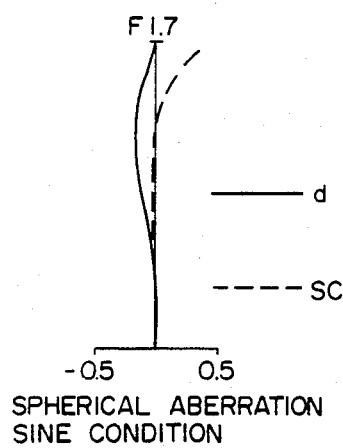
FIGS. 22a to 22c represent the aberration curves of the nineteenth embodiment.
Figure 22B:
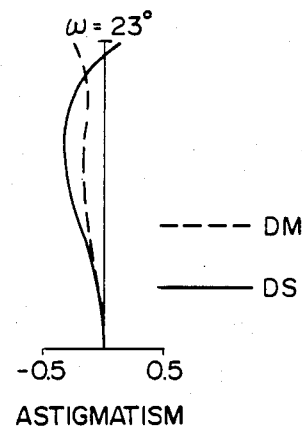
Figure 22C:
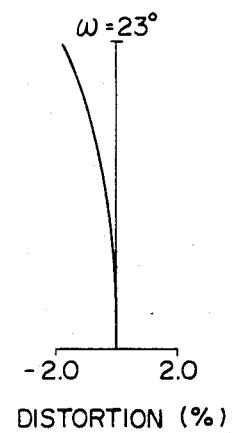
Figure 23A:
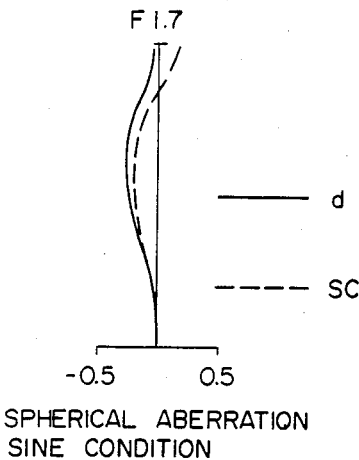
FIGS. 23a to 23c represent the aberration curves of the twentieth embodiment.
Figure 23B:
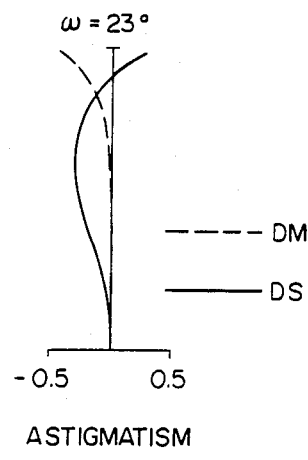
Figure 23C:
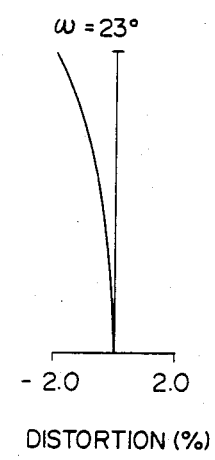
Figure 24A:
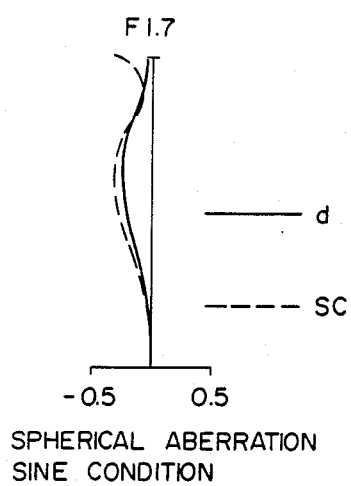
FIGS. 24a to 24c represent the aberration curves of the twenty-first embodiment.
Figure 24B:
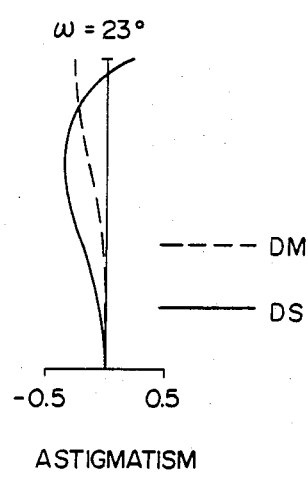
Figure 24C:
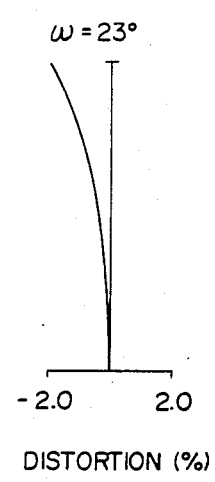

Furthermore, the above type lens system as shown in FIGS. 1 and 2 can be modified to a Xenotar type lens system shown in FIG. 3, by reversing the lens system shown in FIGS. 1 and 2. Therefore, as shown in FIG. 3, the present invention provides a Xenotar type photographic lens system of 5-elements comprising from the object side to the image side, a first lens element ($L_1$) of a positive lens element having an object side surface convex to the object side; a second lens element ($L_2$) of a positive meniscus lens element convex to the object side; a third lens element ($L_3$) of a negative meniscus lens element concave to the image side; a fourth lens element ($L_4$) of a negative meniscus lens element concave to the object side; and a fifth lens element ($L_5$) of a positive lens element, wherein the lens system fulfills the following conditions;

$$1.45 < N_4 < 1.65 \tag{5}$$

$$0.23 < r_4/r_5 < 0.85 \tag{6}$$

$$0.28 < |\phi_4/\phi| < 0.55 \tag{7}$$

wherein, $N_4$ represents the refractive index of the fourth lens element ($L_4$); $r_4$ represents the radius of curvature of the image side surface of the second lens element ($L_2$); $r_5$ represents the radius of curvature of the object side surface of the third lens element ($L_3$); $\phi_4$ represents the refractive power of the fourth lens element ($L_4$); and $\phi$ represehts the refractive power of the whole lens system.

Condition (5) limits the refractive index of the fourth lens element ($L_4$). The fourth lens element ($L_4$) can be made of the synthetic resin material by satisfying the condition (5). If the fourth lens element ($L_4$) is made of the synthetic resin material, the manufacturing procedure of the fourth lens element becomes more easy, and the cost of the whole lens system is decreased. Additionally, the weight of the whole lens system is also decreased. The upper limit of the condition (5) is almost equal to the upper limit of the synthetic resin material. Therefore, if the upper limit of the condition (5) is violated, it is difficult to make the fourth lens element ($L_4$) with the synthetic resin material. On the contrary, the synthetic resin material is applied to the fourth lens element instead of the glass material, the coma is deteriorated in the middle range of the image. The reason is that the refractive index of the synthetic resin material is lower than that of the glass material applied to the fourth lens element in the conventional design. If the lower limit of the condition (5) is violated, it becomes difficult to correct the coma well.

Condition (6) is effective for correcting the coma by an air lens formed between the second lens element ($L_2$) and the third lens element ($L_3$). Namely, the condition (6) limit the ratio in radius of curvature of the image side surface of the second lens element ($L_2$) to the object side surface of the third lens element ($L_3$). If the upper limit of the condition (6) is violated, the coma can not be corrected sufficiently. If the lower limit of the condition (6) is violated, although the coma is corrected sufficiently, the astigmatic difference is increased undesirably.

Condition (7) relates to correct the spherical aberration and the field curvature. If the upper limit of the condition (7) is violated, the spherical aberration is in under-correcting condition. On the other hand, if the lower limit of the condition (7) is violated, since the Petzval sum is undesirably increased, the field curvature is in an under-correcting condition, and the spherical aberration is in an over-correcting condition.

Furthermore, in order to secure the back focal distance required for the single lens reflex camera system with correcting the distortion well, the Xenotar type lens system should fulfill the following condition:

$$0.09 < \phi_F/\phi_R < 0.26 \tag{8}$$

wherein, $\phi_F$ represents the compound refractive power of the first to third lens elements; and $\phi_R$ represents the compound refractive power of the fourth and fifth lens elements.

If the upper limit of the condition (8) is violated, it becomes difficlut to secure the back focal distance required for the single lens reflex camera system. Contrary, if the lower limit of the condition (8) is violated, the negative distortion is greatly generated, although the sufficient back focal distance can be secured.

If the lens element is made of the synthetic resin material, it becomes easy to introduce an aspheric surface to such a lens element in comparison with the glass lens element. In this Xenotar type lens system, in order to further correct the coma well, the fourth lens element ($L_4$) is made of the synthetic resin material and at least a surface of the fourth lens element ($L_4$) is aspheric.

The following Tables 1 to 21 disclose, respectively, the first through twenty-first embodiments of the present invention. In the Tables, f equals the focal length, r is the radius of curvature with respective sub numbers indicating the surfaces from the object to image side along the optical axis, d represents the axial distance and includes both the air spaces and the actual thickness of the lenses along the optical axis, N equals the refractive index and again, the sub numbers refer to the particular optical element from the object to image side, and finally, ν equals the Abbe number and the sub numbers refer to the specific lens elements from the object to image side. The asterisk (*) (**) represent the aspheric surface, and its coefficients are shown at the bottom of respective Tables.

Here, the aspheric coefficients are defined by the following equation:

$$X = \frac{Y^2}{r_i + r_i\sqrt{1 - (Y/r_i)^2}} + aY^2 + bY^4 + cY^6 + dY^8 + \ldots$$

wherein, $r_i$ represents the paraxial radius of curvature, of the basic spheric surface, X represents the coordinate along the optical surface measured from the top of the basic surface, and Y represents the coordinate perpendicular to the optical axis measured from the optical axis.

TABLE 1

[Embodiment 1]
$2w = 46°$  $F_{No} = 1.83$  $f = 100$

| | radius of curvature | axial distance | refractive index (Nd) | Abbe number |
|---|---|---|---|---|
| $r_1$ | 46.869 | | | |
| | | $d_1$ 11.00 | $N_1$ 1.6968 | $\nu_1$ 56.47 |
| $r_2$ | 134.016 | | | |
| | | $d_2$ 0.31 | | |
| $r_3$ | 34.763 | | | |
| | | $d_3$ 7.03 | $N_2$ 1.8052 | $\nu_2$ 25.43 |
| $r_4$ | 25.296 | | | |
| | | $d_4$ 25.12 | | |
| $r_5$ | −32.348 | | | |
| | | $d_5$ 3.01 | $N_3$ 1.7618 | $\nu_3$ 26.55 |
| $r_6$ | 652.469 | | | |
| | | $d_6$ 1.92 | | |
| $r_7$ | −220.066 | | | |
| | | $d_7$ 9.01 | $N_4$ 1.7200 | $\nu_4$ 52.14 |
| $r_8$ | −48.461 | | | |
| | | $d_8$ 0.31 | | |
| $r_9$ | 344.304 | | | |
| | | $d_9$ 9.99 | $N_5$ 1.8050 | $\nu_5$ 40.97 |
| $r_{10}$ | −63.063 | | | |

$\left|\dfrac{\phi A}{\phi}\right| = 0.445$ $r_3/(r_4 + d_3) = 1.075$ $\dfrac{d_4}{\phi} = 0.251$ $\left|\dfrac{\phi_1}{\phi_2}\right| = 1.754$

TABLE 2

[Embodiment 2]
$2w = 46°$  $F_{No} = 1.73$  $f = 100$

| | radius of curvature | axial distance | refractive index (Nd) | Abbe number |
|---|---|---|---|---|
| $r_1$ | 43.619 | | | |
| | | $d_1$ 10.00 | $N_1$ 1.6180 | $\nu_1$ 63.45 |
| $r_2$ | 140.954 | | | |
| | | $d_2$ 0.31 | | |
| $r_3$ | 34.042 | | | |
| | | $d_3$ 6.70 | $N_2$ 1.6830 | $\nu_2$ 31.52 |
| $r_4$ | 24.480 | | | |
| | | $d_4$ 26.00 | | |

TABLE 2-continued

[Embodiment 2]
$2w = 46°$  $F_{No} = 1.73$  $f = 100$

| | radius of curvature | axial distance | refractive index (Nd) | Abbe number |
|---|---|---|---|---|
| $r_5$ | −31.000 | | | |
| | | $d_5$ 3.50 | $N_3$ 1.7500 | $\nu_3$ 25.14 |
| $r_6$ | 1591.225 | | | |
| | | $d_6$ 3.50 | | |
| $r_7$ | −119.470 | | | |
| | | $d_7$ 5.50 | $N_4$ 1.8340 | $\nu_4$ 37.05 |
| $r_8$ | −48.330 | | | |
| | | $d_8$ 0.31 | | |
| $r_9$ | 367.308 | | | |
| | | $d_9$ 8.50 | $N_5$ 1.7883 | $\nu_5$ 47.32 |
| $r_{10}$ | −56.921 | | | |

$\left|\dfrac{\phi A}{\phi}\right| = 0.746$ $r_3/(r_4 + d_3) = 1.092$ $\dfrac{d_4}{\phi} = 0.260$ $\left|\dfrac{\phi_1}{\phi_2}\right| = 1.813$

TABLE 3

[Embodiment 3]
$2w = 46°$  $F_{No} = 1.73$  $f = 100$

| | radius of curvature | axial distance | refractive index (Nd) | Abbe number |
|---|---|---|---|---|
| $r_1$ | 43.985 | | | |
| | | $d_1$ 11.15 | $N_1$ 1.6700 | $\nu_1$ 57.07 |
| $r_2$ | 122.820 | | | |
| | | $d_2$ 0.31 | | |
| $r_3$ | 33.813 | | | |
| | | $d_3$ 6.83 | $N_2$ 1.7006 | $\nu_2$ 30.11 |
| $r_4$ | 23.814 | | | |
| | | $d_4$ 26.55 | | |
| $r_5$ | −29.875 | | | |
| | | $d_5$ 4.27 | $N_3$ 1.7500 | $\nu_3$ 25.14 |
| $r_6$ | 5113.782 | | | |
| | | $d_6$ 2.47 | | |
| $r_7$ | −137.957 | | | |
| | | $d_7$ 6.03 | $N_4$ 1.7725 | $\nu_4$ 49.77 |
| $r_8$ | −46.533 | | | |
| | | $d_8$ 0.31 | | |
| $r_9$ | 509.383 | | | |
| | | $d_9$ 9.24 | $N_5$ 1.8070 | $\nu_5$ 39.71 |
| $r_{10}$ | −55.235 | | | |

$\left|\dfrac{\phi A}{\phi}\right| = 0.575$ $r_3/(r_4 + d_3) = 1.103$ $\dfrac{d_4}{\phi} = 0.266$ $\left|\dfrac{\phi_1}{\phi_2}\right| = 1.652$

TABLE 4

[Embodiment 4]
$2w = 46°$  $F_{No} = 1.73$  $f = 100$

| | radius of curvature | axial distance | refractive index (Nd) | Abbe number |
|---|---|---|---|---|
| $r_1$ | 43.940 | | | |
| | | $d_1$ 10.60 | $N_1$ 1.7130 | $\nu_1$ 53.93 |

TABLE 4-continued

[Embodiment 4]

| | 2w = 46° radius of curvature | $F_{No}$ = 1.73 axial distance | f = 100 refractive index (Nd) | Abbe number |
|---|---|---|---|---|
| $r_2$ | 149.478 | | | |
| | | $d_2$ 0.31 | | |
| $r_3$* | 50.409 | | | |
| | | $d_3$ 7.20 | $N_2$ 1.5916 | $\nu_2$ 30.90 |
| $r_4$ | 28.529 | | | |
| | | $d_4$ 27.46 | | |
| $r_5$ | −30.454 | | | |
| | | $d_5$ 3.50 | $N_3$ 1.7500 | $\nu_3$ 25.14 |
| $r_6$ | −580.252 | | | |
| | | $d_6$ 2.60 | | |
| $r_7$ | −98.629 | | | |
| | | $d_7$ 5.70 | $N_4$ 1.8340 | $\nu_4$ 37.05 |
| $r_8$ | −44.344 | | | |
| | | $d_8$ 0.31 | | |
| $r_9$ | 456.704 | | | |
| | | $d_9$ 7.80 | $N_5$ 1.7885 | $\nu_5$ 45.68 |
| $r_{10}$ | −58.342 | | | |

*aspheric coefficients of $r_3$
a = 0.00000000
b = −0.53758636 × $10^{-6}$
c = 0.57219712 × $10^{-10}$
d = −0.53440595 × $10^{-12}$
e = 0.25120249 × $10^{-15}$
f = 0.10606701 × $10^{-18}$ $\left|\dfrac{\phi A}{\phi}\right|$ = 0.714

$r_3/(r_4 + d_3)$ = 1.411

$\dfrac{d_4}{\phi}$ = 0.275

$\left|\dfrac{\phi_1}{\phi_2}\right|$ = 1.511

TABLE 5

[Embodiment 5]

| | 2w = 46° radius of curvature | $F_{No}$ = 1.73 axial distance | f = 100 refractive index (Nd) | Abbe number |
|---|---|---|---|---|
| $r_1$ | 43.755 | | | |
| | | $d_1$ 10.00 | $N_1$ 1.7130 | $\nu_1$ 53.93 |
| $r_2$ | 133.457 | | | |
| | | $d_2$ 0.45 | | |
| $r_3$ | 47.839 | | | |
| | | $d_3$ 7.42 | $N_2$ 1.5916 | $\nu_2$ 30.90 |
| $r_4$* | 27.921 | | | |
| | | $d_4$ 27.46 | | |
| $r_5$ | −29.913 | | | |
| | | $d_5$ 3.35 | $N_3$ 1.7500 | $\nu_3$ 25.14 |
| $r_6$ | −502.506 | | | |
| | | $d_6$ 2.60 | | |
| $r_7$ | −108.123 | | | |
| | | $d_7$ 5.93 | $N_4$ 1.8340 | $\nu_4$ 37.05 |
| $r_8$ | −44.863 | | | |
| | | $d_8$ 0.45 | | |
| $r_9$ | 804.443 | | | |
| | | $d_9$ 8.00 | $N_5$ 1.7885 | $\nu_5$ 45.68 |
| $r_{10}$ | −56.044 | | | |

*aspheric coefficients of $r_4$
a = 0.00000000
b = 0.75304156 × $10^{-6}$
c = 0.12951100 × $10^{-8}$
d = −0.16784684 × $10^{-11}$
e = 0.62728043 × $10^{-14}$
f = 0.21127977 × $10^{-17}$ $\left|\dfrac{\phi A}{\phi}\right|$ = 0.619

TABLE 5-continued

[Embodiment 5]

| | 2w = 46° radius of curvature | $F_{No}$ = 1.73 axial distance | f = 100 refractive index (Nd) | Abbe number |
|---|---|---|---|---|

$r_3/(r_4 + d_3)$ = 1.354

$\dfrac{d_4}{\phi}$ = 0.275

$\left|\dfrac{\phi_1}{\phi_2}\right|$ = 1.508

TABLE 6

[Embodiment 6]

| | 2w = 46° radius of curvature | $F_{No}$ = 1.73 axial distance | f = 100 refractive index (Nd) | Abbe number |
|---|---|---|---|---|
| $r_1$ | 48.693 | | | |
| | | $d_1$ 10.60 | $N_1$ 1.6968 | $\nu_1$ 56.47 |
| $r_2$ | 224.045 | | | |
| | | $d_2$ 0.31 | | |
| $r_3$* | 45.996 | | | |
| | | $d_3$ 7.20 | $N_2$ 1.5196 | $\nu_2$ 30.90 |
| $r_4$ | 30.848 | | | |
| | | $d_4$ 18.14 | | |
| $r_5$ | −42.400 | | | |
| | | $d_5$ 3.50 | $N_3$ 1.7500 | $\nu_3$ 25.14 |
| $r_6$ | 307.634 | | | |
| | | $d_6$ 5.00 | | |
| $r_7$ | −86.107 | | | |
| | | $d_7$ 5.70 | $N_4$ 1.8050 | $\nu_4$ 40.97 |
| $r_8$ | −48.073 | | | |
| | | $d_8$ 0.31 | | |
| $r_9$ | 164.729 | | | |
| | | $d_9$ 7.80 | $N_5$ 1.7885 | $\nu_5$ 45.68 |
| $r_{10}$ | −90.608 | | | |

*aspheric coefficients of $r_3$
a = 0.00000000
b = −0.43571988 × $10^{-6}$
c = 0.12310331 × $10^{-8}$
d = −0.52687221 × $10^{-11}$
e = 0.79396053 × $10^{-14}$
f = −0.40786420 × $10^{-17}$ $\left|\dfrac{\phi A}{\phi}\right|$ = 1.190

$r_3/(r_4 + d_3)$ = 1.209

$\dfrac{d_4}{\phi}$ = 0.181

$\left|\dfrac{\phi_1}{\phi_2}\right|$ = 2.207

TABLE 7

[Embodiment 7]

| | 2w = 29° radius of curvature | $F_{No}$ = 2.0 axial distance | f = 100 refractive index (Nd) | Abbe number |
|---|---|---|---|---|
| $r_1$ | 45.513 | | | |
| | | $d_1$ 10.60 | $N_1$ 1.6968 | $\nu_1$ 56.47 |
| $r_2$ | 501.420 | | | |
| | | $d_2$ 0.31 | | |
| $r_3$* | 38.056 | | | |
| | | $d_3$ 7.20 | $N_2$ 1.4914 | $\nu_2$ 57.82 |
| $r_4$ | 26.927 | | | |
| | | $d_4$ 11.50 | | |
| $r_5$ | −59.271 | | | |
| | | $d_5$ 3.50 | $N_3$ 1.7500 | $\nu_3$ 25.14 |
| $r_6$ | 78.505 | | | |

TABLE 7-continued

[Embodiment 7]

$2w = 29°$  $F_{No} = 2.0$  $f = 100$

| radius of curvature | axial distance | refractive index (Nd) | Abbe number |
|---|---|---|---|
| $r_7$ −89.844 | | | |
| | $d_6$ 12.00 | | |
| | $d_7$ 5.70 | $N_4$ 1.7725 | $\nu_4$ 54.71 |
| $r_8$ −45.440 | | | |
| | $d_8$ 0.31 | | |
| $r_9$ 72.904 | | | |
| | $d_9$ 7.80 | $N_5$ 1.7725 | $\nu_5$ 54.71 |
| $r_{10}$ 673.918 | | | |

*aspheric coefficients of $r_3$
$a = 0.00000000$
$b = -0.39075591 \times 10^{-6}$
$c = -0.19603087 \times 10^{-3}$
$d = 0.25842258 \times 10^{-11}$
$e = -0.23441377 \times 10^{-14}$
$f = -0.10221357 \times 10^{-17}$ $\left|\dfrac{\phi A}{\phi}\right| = 0.860$ $\dfrac{r_3}{d_4 + d_3} = 1.115$ $\dfrac{d_4}{\phi} = 0.115$ $\left|\dfrac{\phi_1}{\phi_2}\right| = 3.347$

TABLE 8

[Embodiment 8]

$2w = 24.5°$  $F_{No} = 2.0$  $f = 100$

| radius of curvature | axial distance | refractive index (Nd) | Abbe number |
|---|---|---|---|
| $r_1$ 46.748 | | | |
| | $d_1$ 10.60 | $N_1$ 1.7130 | $\nu_1$ 53.93 |
| $r_2$ 566.585 | | | |
| | $d_2$ 0.31 | | |
| $r_3$* 41.161 | | | |
| | $d_3$ 7.20 | $N_2$ 1.4914 | $\nu_2$ 57.82 |
| $r_4$ 28.560 | | | |
| | $d_4$ 11.50 | | |
| $r_5$ −55.636 | | | |
| | $d_5$ 3.50 | $N_3$ 1.7500 | $\nu_3$ 25.14 |
| $r_6$ 80.530 | | | |
| | $d_6$ 12.00 | | |
| $r_7$ −79.280 | | | |
| | $d_7$ 5.70 | $N_4$ 1.7725 | $\nu_4$ 54.71 |
| $r_8$ −43.708 | | | |
| | $d_8$ 0.31 | | |
| $r_9$ 75.361 | | | |
| | $d_9$ 7.80 | $N_5$ 1.7725 | $\nu_5$ 54.71 |
| $r_{10}$ ∞ | | | |

*aspheric coefficients of $r_3$
$a = 0.00000000$
$b = -0.47667408 \times 10^{-6}$
$c = -0.71932497 \times 10^{-9}$
$d = 0.15442798 \times 10^{-13}$
$e = 0.44988974 \times 10^{-15}$
$f = -0.61322938 \times 10^{-18}$ $\left|\dfrac{\phi A}{\phi}\right| = 2.01$ $\dfrac{r_3}{r_4 + d_3} = 1.151$ $\dfrac{d_4}{\phi} = 1.15$

TABLE 8-continued

[Embodiment 8]

$2w = 24.5°$  $F_{No} = 2.0$  $f = 100$ $\left|\dfrac{\phi_1}{\phi_2}\right| = 3.30$

TABLE 9

[Embodiment 9]
$2w = 46°$  $F_{No} = 2.0$  $f = 100$

| radius of curvature | axial distance | refractive index | Abbe number |
|---|---|---|---|
| $r_1$ 53.653 | | | |
| | $d_1$ 10.00 | $N_1$ 1.8070 | $\nu_1$ 39.71 |
| $r_2$ 294.999 | | | |
| | $d_2$ 0.31 | | |
| $r_3$ 39.378 | | | |
| | $d_3$ 6.74 | $N_2$ 1.7725 | $\nu_2$ 49.77 |
| $r_4$ 51.783 | | | |
| | $d_4$ 3.30 | | |
| $r_5$ 197.314 | | | |
| | $d_5$ 2.00 | $N_3$ 1.7500 | $\nu_3$ 25.14 |
| $r_6$ 27.310 | | | |
| | $d_6$ 19.60 | | |
| $r_7$ −26.025 | | | |
| | $d_7$ 5.84 | $N_4$ 1.4914 | $\nu_4$ 57.82 |
| $r_8$ −34.912 | | | |
| | $d_8$ 0.31 | | |
| $r_9$ 379.981 | | | |
| | $d_9$ 7.55 | $N_5$ 1.6180 | $\nu_5$ 63.45 |
| $r_{10}$ −45.874 | | | |

$N_4 = 1.4914$   $r_4/r_5 = 0.262$
$\phi_F/\phi_R = 0.143$   $|\phi_4/\phi| = 0.377$

TABLE 10

[Embodiment 10]
$2w = 46°$  $F_{No} = 2.0$  $f = 100$

| radius of curvature | axial distance | refractive index | Abbe number |
|---|---|---|---|
| $r_1$ 54.174 | | | |
| | $d_1$ 9.00 | $N_1$ 1.8500 | $\nu_1$ 39.92 |
| $r_2$ 241.075 | | | |
| | $d_2$ 0.50 | | |
| $r_3$ 38.328 | | | |
| | $d_3$ 6.20 | $N_2$ 1.7200 | $\nu_2$ 50.31 |
| $r_4$ 50.157 | | | |
| | $d_4$ 3.15 | | |
| $r_5$ 197.147 | | | |
| | $d_5$ 2.57 | $N_3$ 1.7500 | $\nu_3$ 25.14 |
| $r_6$ 28.540 | | | |
| | $d_6$ 17.60 | | |
| $r_7$ −29.591 | | | |
| | $d_7$ 5.55 | $N_4$ 1.4914 | $\nu_4$ 57.82 |
| $r_8$ −41.495 | | | |
| | $d_8$ 0.50 | | |
| $r_9$ 296.299 | | | |
| | $d_9$ 8.00 | $N_5$ 1.6583 | $\nu_5$ 58.52 |
| $r_{10}$ −50.857 | | | |

$N_4 = 1.4914$   $r_4/r_5 = 0.254$
$\phi_F/\phi_R = 0.156$   $|\phi_4/\phi| = 0.403$

TABLE 11

[Embodiment 11]
$2w = 46°$  $F_{No} = 2.0$  $f = 100$

| radius of curvature | axial distance | refractive index | Abbe number |
|---|---|---|---|
| $r_1$ 55.873 | | | |
| | $d_1$ 9.50 | $N_1$ 1.8050 | $\nu_1$ 40.97 |
| $r_2$ 278.010 | | | |

TABLE 11-continued

[Embodiment 11]
2w = 46°  F$_{No}$ = 2.0  f = 100

|     | radius of curvature |       | axial distance |       | refractive index |       | Abbe number |
|-----|------|-----|------|-------|--------|-------|-------|
| r$_3$ | 40.037 |   |      |       |        |       |       |
|     |        | d$_2$ | 0.50 |       |        |       |       |
| r$_4$ | 53.109 |   |      |       |        |       |       |
|     |        | d$_3$ | 6.00 | N$_2$ | 1.7725 | ν$_2$ | 49.77 |
| r$_5$ | 194.394 |  |      |       |        |       |       |
|     |        | d$_4$ | 3.83 |       |        |       |       |
| r$_6$ | 28.881 |   |      |       |        |       |       |
|     |        | d$_5$ | 3.00 | N$_3$ | 1.7500 | ν$_3$ | 25.14 |
| r$_7$ | −28.894 |  |     |       |        |       |       |
|     |        | d$_6$ | 17.40 |      |        |       |       |
| r$_8$ | −39.678 |  |     |       |        |       |       |
|     |        | d$_7$ | 6.00 | N$_4$ | 1.4914 | ν$_4$ | 57.82 |
| r$_9$ | 273.838 |  |     |       |        |       |       |
|     |        | d$_8$ | 0.50 |       |        |       |       |
| r$_{10}$ | −52.063 |  |   |       |        |       |       |
|     |        | d$_9$ | 9.00 | N$_5$ | 1.6583 | ν$_5$ | 58.52 |

N$_4$ = 1.4914    r$_4$/r$_5$ = 0.273
φ$_F$/φ$_R$ = 0.148    |φ$_4$/φ| = 0.377

TABLE 12

[Embodiment 12]
2w = 46°  F$_{No}$ = 2.0  f = 100

|     | radius of curvature |       | axial distance |       | refractive index |       | Abbe number |
|-----|------|-----|------|-------|--------|-------|-------|
| r$_1$ | 52.431 |   |      |       |        |       |       |
|     |        | d$_1$ | 9.00 | N$_1$ | 1.8050 | ν$_1$ | 40.97 |
| r$_2$ | 255.602 |  |     |       |        |       |       |
|     |        | d$_2$ | 0.40 |       |        |       |       |
| r$_3$ | 36.803 |   |      |       |        |       |       |
|     |        | d$_3$ | 6.00 | N$_2$ | 1.7200 | ν$_2$ | 50.31 |
| r$_4$ | 49.205 |   |      |       |        |       |       |
|     |        | d$_4$ | 3.00 |       |        |       |       |
| r$_5$ | 164.059 |  |     |       |        |       |       |
|     |        | d$_5$ | 2.60 | N$_3$ | 1.7500 | ν$_3$ | 25.14 |
| r$_6$ | 27.596 |   |      |       |        |       |       |
|     |        | d$_6$ | 17.60 |      |        |       |       |
| r$_7$ | −29.291 |  |    |       |        |       |       |
|     |        | d$_7$ | 5.90 | N$_4$ | 1.4914 | ν$_4$ | 57.82 |
| r$_8$ | −42.719 |  |    |       |        |       |       |
|     |        | d$_8$ | 0.50 |       |        |       |       |
| r$_9$ | 359.013 |  |    |       |        |       |       |
|     |        | d$_9$ | 7.50 | N$_5$ | 1.6583 | ν$_5$ | 58.52 |
| r$_{10}$ | −49.451 | |  |       |        |       |       |

N$_4$ = 1.4914    r$_4$/r$_5$ = 0.300
φ$_F$/φ$_R$ = 0.195    |φ$_4$/φ| = 0.451

TABLE 13

[Embodiment 13]
2w = 46°  F$_{No}$ = 2.0  f = 100

|     | radius of curvature |       | axial distance |       | refractive index |       | Abbe number |
|-----|------|-----|------|-------|--------|-------|-------|
| r$_1$ | 52.347 |   |      |       |        |       |       |
|     |        | d$_1$ | 9.00 | N$_1$ | 1.8070 | ν$_1$ | 39.71 |
| r$_2$ | 244.609 |  |    |       |        |       |       |
|     |        | d$_2$ | 0.40 |       |        |       |       |
| r$_3$ | 36.325 |   |      |       |        |       |       |
|     |        | d$_3$ | 5.70 | N$_2$ | 1.7130 | ν$_2$ | 53.93 |
| r$_4$ | 49.445 |   |      |       |        |       |       |
|     |        | d$_4$ | 3.30 |       |        |       |       |
| r$_5$ | 160.991 |  |    |       |        |       |       |
|     |        | d$_5$ | 2.60 | N$_3$ | 1.7500 | ν$_3$ | 25.14 |
| r$_6$ | 27.254 |   |      |       |        |       |       |
|     |        | d$_6$ | 17.60 |      |        |       |       |
| r$_7$ | −28.830 |  |    |       |        |       |       |
|     |        | d$_7$ | 5.60 | N$_4$ | 1.4914 | ν$_4$ | 57.82 |
| r$_8$ | −42.860 |  |    |       |        |       |       |
|     |        | d$_8$ | 0.50 |       |        |       |       |
| r$_9$ | 385.477 |  |    |       |        |       |       |
|     |        | d$_9$ | 6.80 | N$_5$ | 1.6583 | ν$_5$ | 58.52 |
| r$_{10}$ | −47.625 | |  |       |        |       |       |

N$_4$ = 1.4914    r$_4$/r$_5$ = 0.307

TABLE 13-continued

[Embodiment 13]
2w = 46°  F$_{No}$ = 2.0  f = 100

φ$_F$/φ$_R$ = 0.189    |φ$_4$/φ| = 0.485

TABLE 14

[Embodiment 14]
2w = 46°  F$_{No}$ = 20  f = 100

|     | radius of curvature |       | axial distance |       | refractive index |       | Abbe number |
|-----|------|-----|------|-------|--------|-------|-------|
| r$_1$ | 51.868 |  |     |       |        |       |       |
|     |        | d$_1$ | 9.20 | N$_1$ | 1.8500 | ν$_1$ | 39.92 |
| r$_2$ | 218.980 | |   |       |        |       |       |
|     |        | d$_2$ | 0.50 |       |        |       |       |
| r$_3$ | 37.623 |  |     |       |        |       |       |
|     |        | d$_3$ | 5.50 | N$_2$ | 1.7425 | ν$_2$ | 52.51 |
| r$_4$ | 49.113 |  |     |       |        |       |       |
|     |        | d$_4$ | 3.50 |       |        |       |       |
| r$_5$ | 162.777 | |    |       |        |       |       |
|     |        | d$_5$ | 2.10 | N$_3$ | 1.7500 | ν$_3$ | 25.14 |
| r$_6$ | 27.639 |  |     |       |        |       |       |
|     |        | d$_6$ | 17.60 |      |        |       |       |
| r$_7$ | −28.862 | |    |       |        |       |       |
|     |        | d$_7$ | 5.98 | N$_4$ | 1.4914 | ν$_4$ | 57.82 |
| r$_8$ | −41.028 | |    |       |        |       |       |
|     |        | d$_8$ | 0.50 |       |        |       |       |
| r$_9$ | 322.409 | |    |       |        |       |       |
|     |        | d$_9$ | 7.63 | N$_5$ | 1.6405 | ν$_5$ | 60.08 |
| r$_{10}$ | −49.663 | | |       |        |       |       |

N$_4$ = 1.4914    r$_4$/r$_5$ = 0.302
φ$_F$/φ$_R$ = 0.196    |φ$_4$/φ| = 0.423

TABLE 15

[Embodiment 15]
2w = 46°  F$_{NO}$ = 2.0  f = 100

|     | radius of curvature |       | axial distance |       | refractive index |       | Abbe number |
|-----|------|-----|------|-------|--------|-------|-------|
| r$_1$ | 66.533 |  |     |       |        |       |       |
|     |        | d$_1$ | 7.70 | N$_1$ | 1.8340 | ν$_1$ | 37.05 |
| r$_2$ | 293.399 | |   |       |        |       |       |
|     |        | d$_2$ | 0.31 |       |        |       |       |
| r$_3$ | 34.526 |  |     |       |        |       |       |
|     |        | d$_3$ | 8.51 | N$_2$ | 1.7200 | ν$_2$ | 50.31 |
| r$_4$ | 51.717 |  |     |       |        |       |       |
|     |        | d$_4$ | 2.20 |       |        |       |       |
| r$_5$ | 96.732 |  |     |       |        |       |       |
|     |        | d$_5$ | 2.00 | N$_3$ | 1.7500 | ν$_3$ | 25.14 |
| r$_6$ | 25.537 |  |     |       |        |       |       |
|     |        | d$_6$ | 21.32 |      |        |       |       |
| r$_7$ | −26.988 | |    |       |        |       |       |
|     |        | d$_7$ | 5.46 | N$_4$ | 1.5916 | ν$_4$ | 30.90 |
| r$_8$ | −37.908 | |    |       |        |       |       |
|     |        | d$_8$ | 0.31 |       |        |       |       |
| r$_9$ | −565.275 | |   |       |        |       |       |
|     |        | d$_9$ | 7.62 | N$_5$ | 1.6968 | ν$_5$ | 56.47 |
| r$_{10}$ | −43.037 | | |       |        |       |       |

N$_4$ = 1.5916    r$_4$/r$_5$ = 0.535
φ$_F$/φ$_R$ = 0.250    |φ$_4$/φ| = 0.514

TABLE 16

[Embodiment 16]
2w = 46°  F$_{No}$ = 2.0  f = 100

|     | radius of curvature |       | axial distance |       | refractive index |       | Abbe number |
|-----|------|-----|------|-------|--------|-------|-------|
| r$_1$ | 51.674 |  |     |       |        |       |       |
|     |        | d$_1$ | 8.05 | N$_1$ | 1.8070 | ν$_1$ | 39.71 |
| r$_2$ | 184.983 | |   |       |        |       |       |
|     |        | d$_2$ | 0.31 |       |        |       |       |
| r$_3$ | 36.070 |  |     |       |        |       |       |
|     |        | d$_3$ | 7.96 | N$_2$ | 1.744  | ν$_2$ | 44.93 |
| r$_4$ | 50.144 |  |     |       |        |       |       |
|     |        | d$_4$ | 2.20 |       |        |       |       |
| r$_5$ | 105.973 | |    |       |        |       |       |

TABLE 16-continued

[Embodiment 16]
$2w = 46°$  $F_{No} = 2.0$  $f = 100$

|  | radius | axial dist |  | refr index |  | Abbe |
|---|---|---|---|---|---|---|
|  |  | $d_5$  2.00 | $N_3$ | 1.8052 | $\nu_3$ | 25.43 |
| $r_6$ | 25.778 | | | | | |
|  |  | $d_6$  19.28 | | | | |
| $r_7$ | −27.702 | | | | | |
|  |  | $d_7$  5.34 | $N_4$ | 1.5916 | $\nu_4$ | 30.90 |
| $r_8$ | −39.360 | | | | | |
|  |  | $d_8$  0.43 | | | | |
| $r_9$ | 512.397 | | | | | |
|  |  | $d_9$  7.57 | $N_5$ | 1.6700 | $\nu_5$ | 57.07 |
| $r_{10}$ | −45.930 | | | | | |

$N_4 = 1.5916$   $r_4/r_5 = 0.473$
$\phi_F/\phi_R = 0.186$   $|\phi_4/\phi| = 0.525$

TABLE 17

[Embodiment 17]
$2w = 46°$  $F_{No} = 2.0$  $f = 100$

|  | radius of curvature | axial distance |  | refractive index |  | Abbe number |
|---|---|---|---|---|---|---|
| $r_1$ | 51.273 | | | | | |
|  |  | $d_1$  8.25 | $N_1$ | 1.8070 | $\nu_1$ | 39.71 |
| $r_2$ | 231.226 | | | | | |
|  |  | $d_2$  0.31 | | | | |
| $r_3$ | 37.016 | | | | | |
|  |  | $d_3$  7.79 | $N_2$ | 1.7725 | $\nu_2$ | 49.77 |
| $r_4$ | 46.977 | | | | | |
|  |  | $d_4$  2.75 | | | | |
| $r_5$ | 140.095 | | | | | |
|  |  | $d_5$  2.00 | $N_3$ | 1.8052 | $\nu_3$ | 25.43 |
| $r_6$ | 26.067 | | | | | |
|  |  | $d_6$  20.34 | | | | |
| $r_7$ | −24.408 | | | | | |
|  |  | $d_7$  3.91 | $N_4$ | 1.4914 | $\nu_4$ | 57.82 |
| $r_8$ | −32.338 | | | | | |
|  |  | $d_8$  0.15 | | | | |
| $r_9$ | 455.413 | | | | | |
|  |  | $d_9$  8.99 | $N_5$ | 1.6180 | $\nu_5$ | 63.45 |
| $r_{10}$ | −41.697 | | | | | |

$N_4 = 1.4914$   $r_4/r_5 = 0.335$
$\phi_F/\phi_R = 0.096$   $|\phi_4/\phi| = 0.413$

TABLE 18

[Embodiment 18]
$2w = 46°$  $F_{No} = 1.7$  $f = 100$

|  | radius of curvature | axial distance |  | refractive index |  | Abb number |
|---|---|---|---|---|---|---|
| $r_1$ | 66.089 | | | | | |
|  |  | $d_1$  9.38 | $N_1$ | 1.8500 | $\nu_1$ | 39.92 |
| $r_2$ | 342.938 | | | | | |
|  |  | $d_2$  0.34 | | | | |
| $r_3$ | 41.476 | | | | | |
|  |  | $d_3$  7.95 | $N_2$ | 1.7883 | $\nu_2$ | 47.32 |
| $r_4$ | 56.572 | | | | | |
|  |  | $d_4$  3.96 | | | | |
| $r_5$ | 166.383 | | | | | |
|  |  | $d_5$  2.28 | $N_3$ | 1.7500 | $\nu_3$ | 25.14 |
| $r_6$ | 28.755 | | | | | |
|  |  | $d_6$  20.57 | | | | |
| $r_7$ | −25.629 | | | | | |
|  |  | $d_7$  5.30 | $N_4$ | 1.5916 | $\nu_4$ | 30.9 |
| $r_8$ | −32.358 | | | | | |
|  |  | $d_8$  0.40 | | | | |
| $r_9$ | 673.861 | | | | | |
|  |  | $d_9$  9.94 | $N_5$ | 1.6583 | $\nu_5$ | 58.52 |
| $r_{10}$ | −47.854 | | | | | |

$N_4 = 1.5916$   $r_4/r_5 = 0.340$
$\phi_F/\phi_R = 0.140$   $|\phi_4/\phi| = 0.340$

TABLE 19

[Embodiment 19]
$2w = 46°$  $F_{No} = 1.7$  $f = 100$

|  | radius of curvature | axial distance |  | refractive index |  | Abbe number |
|---|---|---|---|---|---|---|
| $r_1$ | 55.495 | | | | | |
|  |  | $d_1$  9.78 | $N_1$ | 1.8070 | $\nu_1$ | 39.71 |
| $r_2$ | 216.539 | | | | | |
|  |  | $d_2$  0.31 | | | | |
| $r_3$ | 39.728 | | | | | |
|  |  | $d_3$  7.57 | $N_2$ | 1.7885 | $\nu_2$ | 45.68 |
| $r_4$ | 54.019 | | | | | |
|  |  | $d_4$  3.69 | | | | |
| $r_5$ | 112.069 | | | | | |
|  |  | $d_5$  2.00 | $N_3$ | 1.7500 | $\nu_3$ | 25.14 |
| $r_6$ | 24.968 | | | | | |
|  |  | $d_6$  21.38 | | | | |
| $r_7^*$ | −26.647 | | | | | |
|  |  | $d_7$  5.18 | $N_4$ | 1.5916 | $\nu_4$ | 30.90 |
| $r_8$ | −37.419 | | | | | |
|  |  | $d_8$  0.43 | | | | |
| $r_9$ | 4271.335 | | | | | |
|  |  | $d_9$  12.00 | $N_5$ | 1.6180 | $\nu_5$ | 63.45 |
| $r_{10}$ | −37.616 | | | | | |

*aspheric coefficients of $r_7$
$a = 0.00000000$,   $d = 0.83421913 \times 10^{-10}$
$b = -0.29249295 \times 10^{-6}$,   $e = -0.12940707 \times 10^{-12}$
$c = -0.22255527 \times 10^{-7}$,   $f = -0.65806102 \times 10^{-16}$ $N_4 = 1.5916$   $r_4/r_5 = 0.482$
$\phi_F/\phi_R = 0.115$   $|\phi_4/\phi| = 0.525$

TABLE 20

[Embodiment 20]
$2w = 46°$  $F_{No} = 1.7$  $f = 100$

|  | radius of curvature | axial distance |  | refractive index |  | Abbe number |
|---|---|---|---|---|---|---|
| $r_1$ | 56.180 | | | | | |
|  |  | $d_1$  8.77 | $N_1$ | 1.8070 | $\nu_1$ | 39.71 |
| $r_2$ | 324.122 | | | | | |
|  |  | $d_2$  0.31 | | | | |
| $r_3$ | 43.006 | | | | | |
|  |  | $d_3$  7.46 | $N_2$ | 1.7725 | $\nu_2$ | 49.77 |
| $r_4$ | 57.152 | | | | | |
|  |  | $d_4$  3.99 | | | | |
| $r_5$ | 230.214 | | | | | |
|  |  | $d_5$  2.00 | $N_3$ | 1.7500 | $\nu_3$ | 25.14 |
| $r_6$ | 28.761 | | | | | |
|  |  | $d_6$  22.95 | | | | |
| $r_7$ | −25.987 | | | | | |
|  |  | $d_7$  5.56 | $N_4$ | 1.5916 | $\nu_4$ | 30.90 |
| $r_8^*$ | −32.172 | | | | | |
|  |  | $d_8$  0.31 | | | | |
| $r_9$ | 318.774 | | | | | |
|  |  | $d_9$  8.68 | $N_5$ | 1.6180 | $\nu_5$ | 63.45 |
| $r_{10}$ | −49.049 | | | | | |

*aspheric coefficients of $r_8$
$a = 0.00000000$,   $d = -0.33099209 \times 10^{-19}$
$b = 0.16056336 \times 10^{-6}$
$c = 0.60562006 \times 10^{-10}$ $N_4 = 1.5916$   $r_4/r_5 = 0.248$
$\phi_F/\phi_R = 0.128$   $|\phi_4/\phi| = 0.291$

TABLE 21

[Embodiment 21]
$2w = 46°$  $F_{No} = 1.7$  $f = 100$

|  | radius of curvature | axial distance |  | refractive index |  | Abbe number |
|---|---|---|---|---|---|---|
| $r_1$ | 59.642 | | | | | |
|  |  | $d_1$  8.80 | $N_1$ | 1.8070 | $\nu_1$ | 39.71 |
| $r_2$ | 283.016 | | | | | |
|  |  | $d_2$  0.31 | | | | |
| $r_3$ | 40.743 | | | | | |
|  |  | $d_3$  7.64 | $N_2$ | 1.7725 | $\nu_2$ | 49.77 |
| $r_4$ | 55.628 | | | | | |

TABLE 21-continued

[Embodiment 21]
$2w = 46°$  $F_{No} = 1.7$  $f = 100$

|     |          |       |       |       |       |       |       |
|-----|----------|-------|-------|-------|-------|-------|-------|
|     |          | $d_4$ | 3.90  |       |       |       |       |
| $r_5$ | 157.384  |       |       |       |       |       |       |
|     |          | $d_5$ | 2.00  | $N_3$ | 1.7500 | $v_3$ | 25.14 |
| $r_6$ | 28.545   |       |       |       |       |       |       |
|     |          | $d_6$ | 20.85 |       |       |       |       |
| $r_7^*$ | $-27.390$ |       |       |       |       |       |       |
|     |          | $d_7$ | 5.54  | $N_4$ | 1.5916 | $v_4$ | 30.90 |
| $r_8^{**}$ | $-35.937$ |       |       |       |       |       |       |
|     |          | $d_8$ | 0.31  |       |       |       |       |
| $r_9$ | 433.253  |       |       |       |       |       |       |
|     |          | $d_9$ | 9.50  | $N_5$ | 1.6583 | $v_5$ | 58.52 |
| $r_{10}$ | $-48.876$ |       |       |       |       |       |       |

| aspheric coefficient of $r_7$ | |
|---|---|
| $a = 0.00000000$ | $d = 0.32670120 \times 10^{-11}$ |
| $b = -0.41966266 \times 10^{-6}$ | $e = 0.53268310 \times 10^{-13}$ |
| $c = 0.45895292 \times 10^{-9}$ | $f = -0.16066657 \times 10^{-15}$ |

| aspheric coefficient of $r_8$ | |
|---|---|
| $a = 0.00000000$ | $d = 0.31562336 \times 10^{-10}$ |
| $b = 0.10863225 \times 10^{-6}$ | $e = -0.57665068 \times 10^{-13}$ |
| $c = -0.46792523 \times 10^{-8}$ | $f = 0.22712799 \times 10^{-16}$ |

| $N_4 = 1.5916$ | $r_4/r_5 = 0.353$ |
|---|---|
| $\phi_F/\phi_R = 0.161$ | $|\phi_4/\phi| = 0.390$ |

What is claimed is:

1. A photographic lens system of 5-elements comprising from the object side to the image side;
   a first lens element of a positive lens element having an object side surface convex to the object side;
   a second lens element of a negative meniscus lens element concave to the image side;
   a third lens element of a negative lens element having an object side surface concave to the object side;
   a fourth lens element of a positive meniscus lens element convex to the image side; and
   a fifth lens element of a positive lens element, wherein an air lens formed between the third lens element and the fourth lens element has a negative refractive power, and wherein the lens system fulfills the following conditions:

$$0.30 < |\phi_A/\phi| < 3.00$$

$$1.05 < r_3/(r_4 + d_3) < 2.0$$

wherein,
$\phi_A$ represents the refractive power of the air lens formed between the third lens element and the fourth lens element;
$\phi$ represents the compound refractive power of the whole lens system;
$r_3$ represents the radius of curvature of the object side surface of the second lens element;
$r_4$ represents the radius of curvature of the image side surface of the second lens element; and
$d_3$ represents the axial thickness of the second lens element.

2. A photographic lens system as claimed in claim 1, wherein the lens system further fulfills the following conditions:

$$0.10 < d_4/\phi < 0.35$$

$$1.00 < |\phi_1/\phi_2| < 4.50$$

wherein,
$d_4$ represents the axial distance between the image side surface of the second lens element and the object side surface of the third lens element;
$\phi_1$ represents the refractive power of the first lens element; and
$\phi_2$ represents the refractive power of the second lens element.

3. A photographic lens system as claimed in claim 2, wherein the object side surface of the second lens element is aspheric.

4. A photographic lens system as claimed in claim 2, wherein the image side surface of the second lens element is aspheric.

5. A photographic lens system as claimed in claim 2, wherein both of the object side surface and the image side surface of the second lens element are spheric.

6. A photographic lens system of 5-elements comprising from the object side to the image side:
   a first lens element of a positive lens element having an object side surface convex to the object side;
   a second lens element of a positive meniscus lens element convex to the object side;
   a third lens element of a negative meniscus lens element concave to the image side;
   a fourth lens element of a nagative meniscus lens element concave to the object side; and
   a fifth lens element of a positive lens element, wherein the lens system fulfills the following conditions;

$$1.45 < N_4 < 1.65$$

$$0.25 < r_4/r_5 < 0.58$$

$$-0.55 < |\phi_4/\phi| < -0.28$$

wherein
$N_4$ represents the refractive index of the fourth lens element;
$r_4$ represents the radius curvature of the image side surface of the second lens element;
$r_5$ represents the radius of curvature of the object side surface of the third lens element;
$\phi_4$ represents the refractive power of the fourth lens element; and
$\phi$ represents the refractive power of the whole lens system.

7. A photographic lens system as claimed in claim 6, wherein the lens system further fulfills the following condition;

$$0.09 < \phi_F/\phi_R < 0.26$$

wherein,
$\phi_F$ represents the compound refractive power of the first to third lens elements; and
$\phi_R$ represents the compound refractive power of the fourth and fifth lens elements.

8. A photographic lens system as claimed in claim 7, wherein the object side surface of the fourth lens element is aspheric.

9. A photographic lens system as claimed in claim 7, wherein the image side surface of the fourth lens element is spheric.

10. A photographic lens system as claimed in claim 7, wherein the image side surface of the fourth lens element is aspheric.

11. A photographic lens system as claimed in claim 10, wherein the object and image side surfaces of the fourth lens element is spheric.

* * * * *